United States Patent [19]
Urquhart et al.

[11] Patent Number: 6,129,275
[45] Date of Patent: Oct. 10, 2000

[54] SMART CARD TRANSACTION SYSTEM AND ENCODER-DISPENSER

[75] Inventors: Bruce Albert Urquhart, Boynton Beach; Keith William Evans, Lake Worth, both of Fla.

[73] Assignee: The Eastern Company, Naugatuck, Conn.

[21] Appl. No.: 09/102,489

[22] Filed: Jun. 22, 1998

Related U.S. Application Data

[63] Continuation-in-part of application No. PCT/US96/20690, Dec. 19, 1996.
[60] Provisional application No. 60/008,937, Dec. 20, 1995.

[51] Int. Cl.[7] .................................................... G06F 7/08
[52] U.S. Cl. ........................ 235/381; 235/380; 235/492; 235/488; 902/26; 902/27
[58] Field of Search ..................... 235/380, 492, 235/488, 481, 441, 375, 379, 439, 440, 448, 487, 381; 902/26, 27, 29

[56] References Cited

U.S. PATENT DOCUMENTS

| | | |
|---|---|---|
| 4,701,600 | 10/1987 | Beech et al. ............................ 235/375 |
| 4,825,054 | 4/1989 | Rust et al. ............................... 235/380 |
| 4,851,651 | 7/1989 | Gaucher .................................. 235/380 |
| 4,900,906 | 2/1990 | Pusic ...................................... 235/381 |
| 4,965,437 | 10/1990 | Nagai ..................................... 235/381 |
| 5,278,395 | 1/1994 | Benezet ................................. 235/384 |
| 5,564,857 | 10/1996 | Schluter ................................... 405/36 |
| 5,687,087 | 11/1997 | Taggart .............................. 364/479.03 |
| 5,753,897 | 5/1998 | Kasper ................................... 235/380 |
| 5,949,046 | 9/1999 | Kenneth et al. ........................ 235/380 |

Primary Examiner—Karl D. Frech
Assistant Examiner—Daniel S Felten
Attorney, Agent, or Firm—Cowan Liebowitz & Latman

[57] ABSTRACT

The disclosed apparatus is a stand alone integrated smart card circuit chip card vending machine. It accepts bills in $1, $5, $10, $20 and $50 denominations and/or credit cards and issues stored value smart cards for the value requested. It can also telephone a center to validate credit card transactions or send diagnostic and statistical reports. This invention has the capability to read and write to a card while it is in the dispenser stack, therefore the card has no value while in the dispenser and is not released until payment is received, that is, the cards are encoded in real time before they are issued.

28 Claims, 18 Drawing Sheets

6,129,275

SMART CARD TRANSACTION SYSTEM AND ENCODER-DISPENSER

RELATED APPLICATION

This is a continuation in part of International Application No. PCT/US96/20690 and entitled Smart Card System and Encoder-Dispenser filed Dec. 19, 1996, which in turn is a continuation in part of U.S. Provisional Patent Application Serial No. 60/008,937 and entitled Smart Card Transaction System and Encoder-Dispenser filed Dec. 20, 1995.

FIELD OF THE INVENTION

This invention relates to an integrated circuit smart card dispensing system that issues and/or adds value to stored value smart chip cards used as debit cards for purchasing consumables such as food and drinks as well as for buying services such as telephone and laundry.

BACKGROUND OF THE INVENTION

This invention relates to the issuing or dispensing of stored value smart chip cards from stand alone terminals that may be located in airports, arcades, shops, shopping malls and in places where the public may purchase these cards using cash or a credit card. Although there are a number of card dispensers on the market there are none that actually encode a smart chip card as it is being dispensed. There are two basic types of smart card. The simplest is the memory or stored value card which is frequently a disposable magnetic strip card. The more complex smart card employs an integrated circuit and is basically a "PC on a card". Due to its security, these are used as credit cards replacing the magnetic strip card.

Currently available telephone card dispensers issue stored value cards. The user must call a central facility to activate the card by its serial number which is sometimes referred to as "encoding before issue". These cards can be time consuming and inconvenient to use.

The smart card was invented by the French company Innovatron in 1974 but was not widely used until the mid 1980's. It is basically a credit card size plastic card with one or more microchips embedded in it. They come in two basic types; first the memory chip card which stores a number of units of value. As the card is used, the units are burned off the chip until they are all used up, then the card is thrown away. The second type is a reprogrammable microprocessor card, or "PC on a card". The price of the card varies depending on the amount and type of memory it contains. Motorola, SGS Thomson and Siemens are the main chip manufacturers.

Pre-paid smart cards are widely accepted in banking and telephone applications in about every country in the world except the U.S.A. However, that is rapidly changing. One of the catalysts was the 1996 Olympics, with Visa, M/C and major banks rushing to place smart cards into service. The telephone industry is also installing smart card phones across the U.S.A.

In 1993, the U.S. phone companies introduced the "dial 800" pre-paid telephone card to test the acceptance of debit cards. The "800" card has the advantage of being useable from any existing telephone, but has the disadvantage that the user has to dial many digits, i.e. the 800 number, a pin number followed by the number you wanted to dial in the first place. The user's debit account is stored in a central computer owned by the phone company. In contrast, the "smart chip card" contains the account on the card and is much easier to use and has proved to be very secure since the smart card uses a crytogram. With many powerful PC's now available, magnetic cards are easy to duplicate and will likely soon disappear from all applications requiring transaction security, such as credit cards.

With the volume of cards in use increasing there is a need for more secure methods for issuing or dispensing cards, whether they are smart cards or magnetic cards. Also, a more convenient manner of dispensing and activating cards is required. Vending machines are presently available which issue uncoded cards. The user must then insert this card in a separate receptacle and code it for a desired value. This can be extremely annoying and confusing, particularly if the user is in a hurry or speaks a foreign language. If the user removes the card but neglects to activate it, the card will be inoperable and the user may be frustrated or inconvenienced.

The present invention is not only a dispenser of cards, but also includes the capability to add value to a card already purchased. There is a read/write head in the reader that performs the encoding of each card so that the cards have no value while they are released from the dispenser. Since the apparatus accepts currency, the enclosure or case is made of high security double plated stainless steel with a triple locking mechanism that is drill proof.

SUMMARY OF INVENTION

It is therefore an object of the present invention to provide an apparatus for encoding an integrated circuit chip card as the card is dispensed from a stack of uncoded cards.

It is a further object of this invention to provide a smart card vending machine that is safer, quicker, easier and less confusing to use than conventional machines.

This invention relates to an apparatus for encoding and dispensing integrated circuit chip cards. The apparatus includes an enclosure having a card dispensing slot and means for accepting a selected mode and amount of monetary payment. There are means mounted within the enclosure for holding a stack of uncoded integrated chip cards such that an integrated circuit chip on each card faces toward a first end of the stack. An encoder mechanism is mounted within the enclosure and located adjacent the first end of the stack of cards. There are means carried by the enclosure for inputting data, including a selected monetary value. Means are responsive to the means for accepting and the means for inputting for verifying that the selected monetary value corresponds to the accepted amount of monetary payment and for directing the encoder mechanism to encode the integrated circuit chip of a leading card positioned at the first end of the stack with the input data. There are means for dispensing the leading card through the card dispensing slot after the leading card has been encoded and sequentially positioning a following card in the stack with its integrated circuit chip adjacent to the encoder mechanism.

In a preferred embodiment, the encoder mechanism includes a smart card read/write head that is incorporated in a specially designed card dispenser to encode cards as they reach the bottom of the stack. Smart cards are stacked in the dispenser with the chip side face down. The 8 contacts of the read head are accurately placed in a standard position on each smart cart. The design of the stack chute has a tolerance of 1 mm. The read/write head is then brought into contact with the 8 contacts of the chip during each card transaction so that information such as the card value can be immediately "written" or stored on the card before its release.

A comprehensive sequence of instructions are programmed into a microprocessor controller to control the operation and interaction between a bill acceptor, credit card reader, telephone transmission circuit board and the card dispensing unit.

A user follows simple instructions on the display. First, the user is instructed to "insert a bill or card" then a) dispense a new card, or b) add value to a card. The remaining instructions on the display instruct the user how to complete or cancel the transaction.

BRIEF DESCRIPTION OF THE DRAWINGS

The invention is described in general with the aid of the following drawings.

DETAILS DESCRIPTION OF PREFERRED EMBODIMENTS

This description will refer to FIGS. 1–7. The apparatus consists of a number of interrelated parts that together form a complete system for storing, encoding, adding value and dispensing integrated circuit smart cards. The component parts are a secure case or housing, bill acceptor, card encoder/dispenser, micro-controller/processor, smart card reader, display, keypad and power supply. There is an optional telephone circuit board for validating credit cards and a small receipt printer. All component parts are contained in the stainless steel case 10 shown in FIG. 1.

Figure 1:
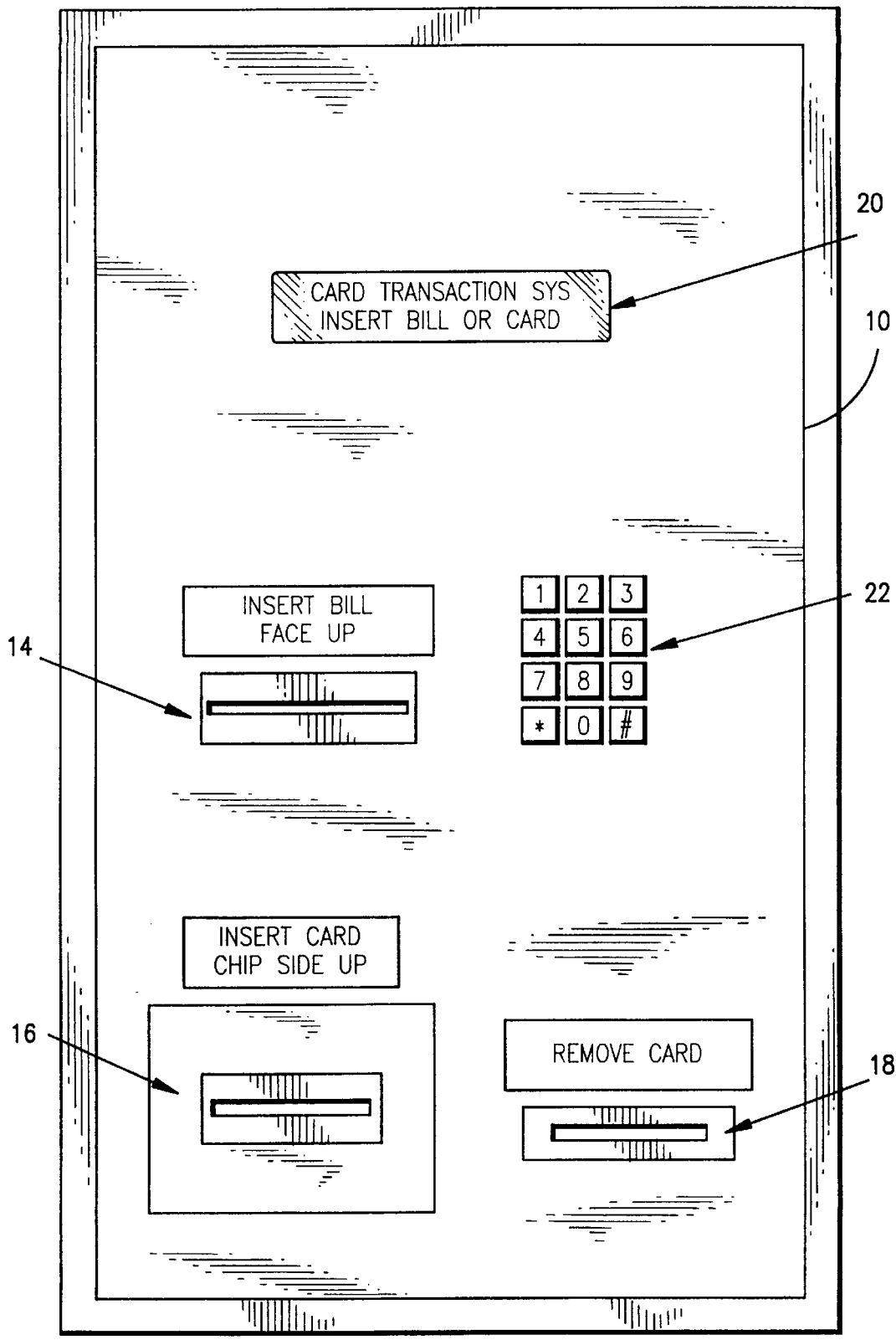
FIG. 1 is a perspective view of the encoding and dispensing apparatus of this invention.
Figure 2:
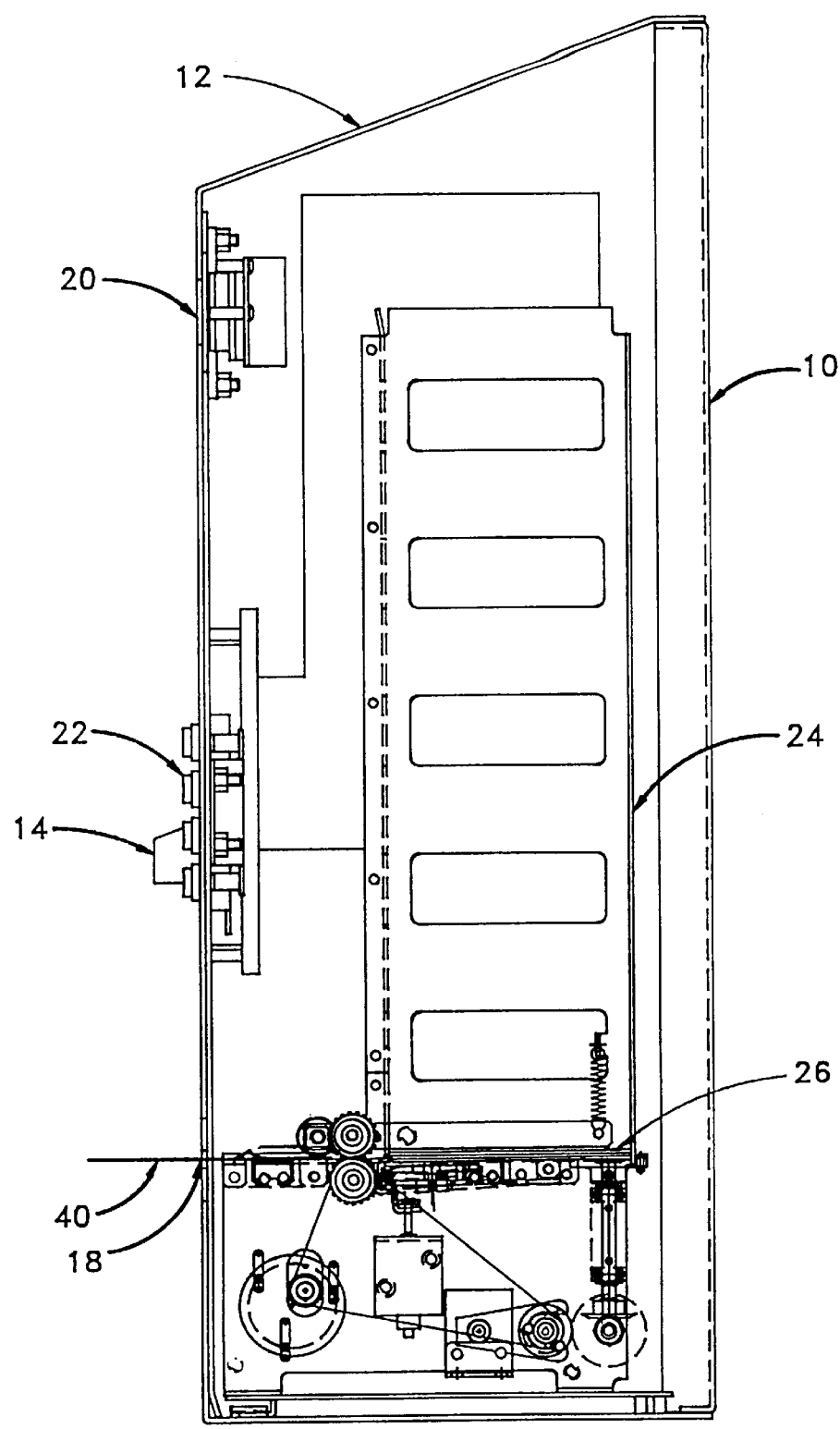
FIG. 2 is a side, cross sectional view of the apparatus.
Figure 3:
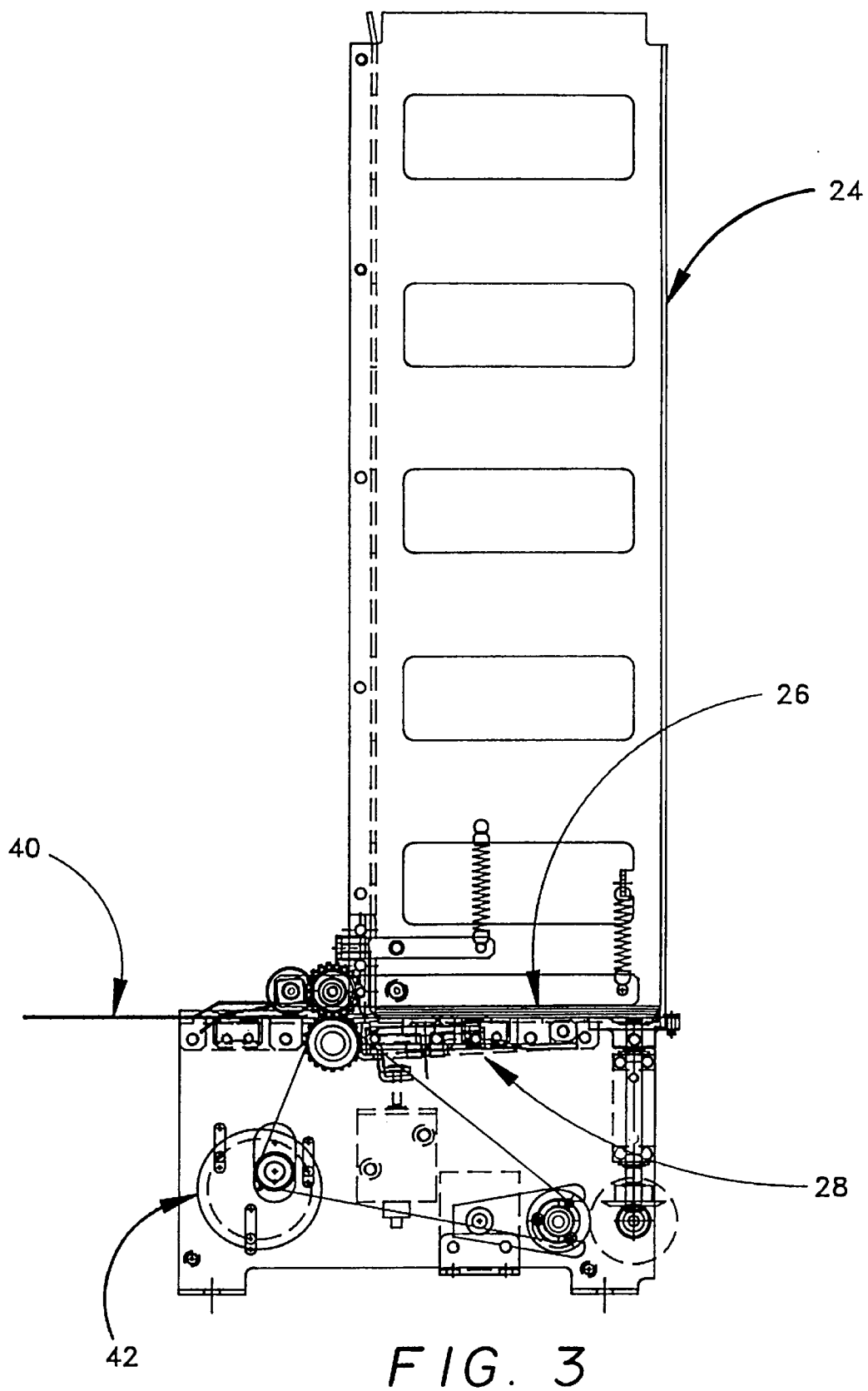
FIG. 3 is an elevational side view of the card stacking, encoding and dispensing components.
Figure 4:
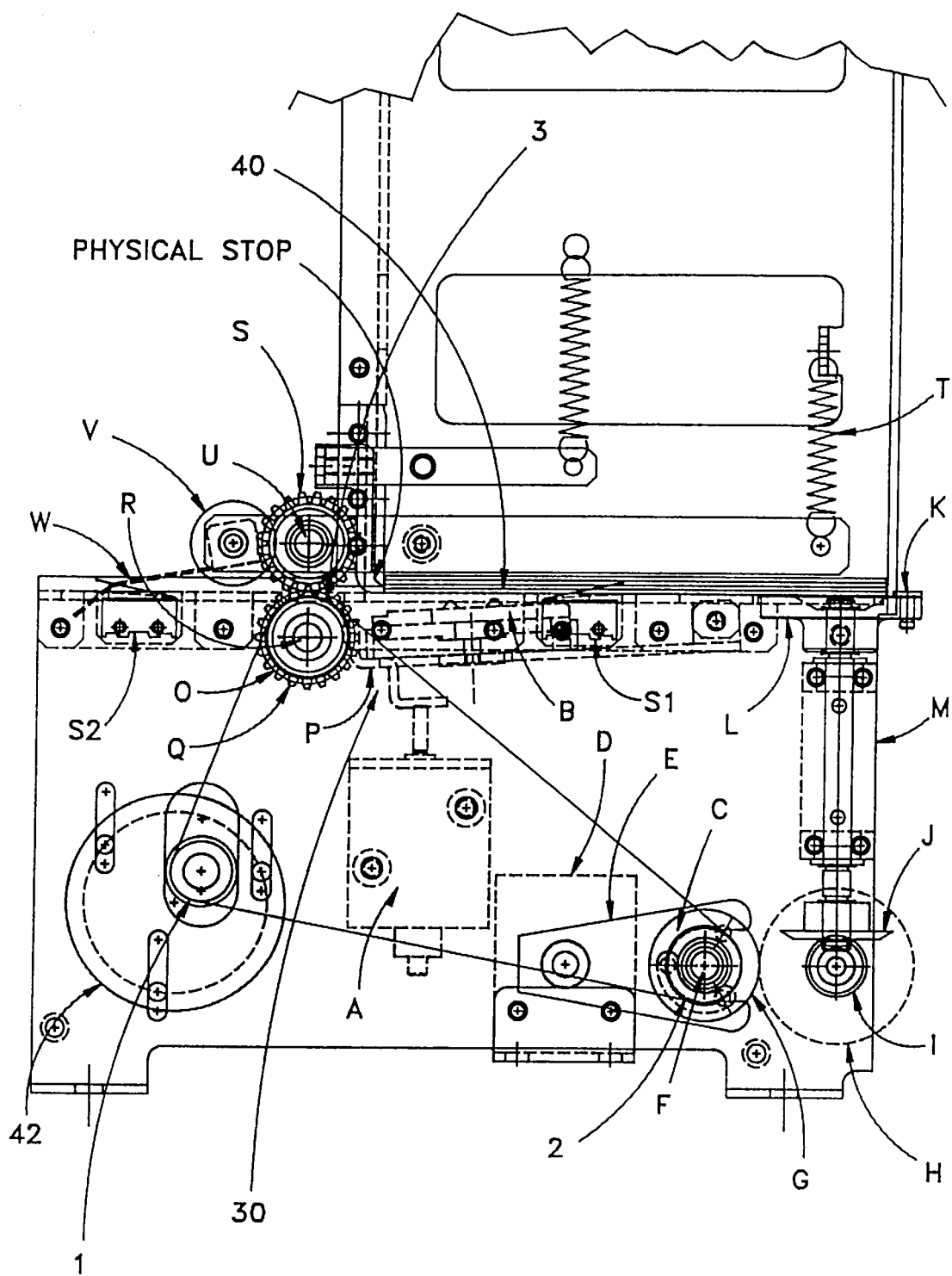
FIG. 4 is a side view of the apparatus showing a stack for holding approximately 300 smart cards, the driving motor, pulleys, rollers and card transport.
Figure 5:
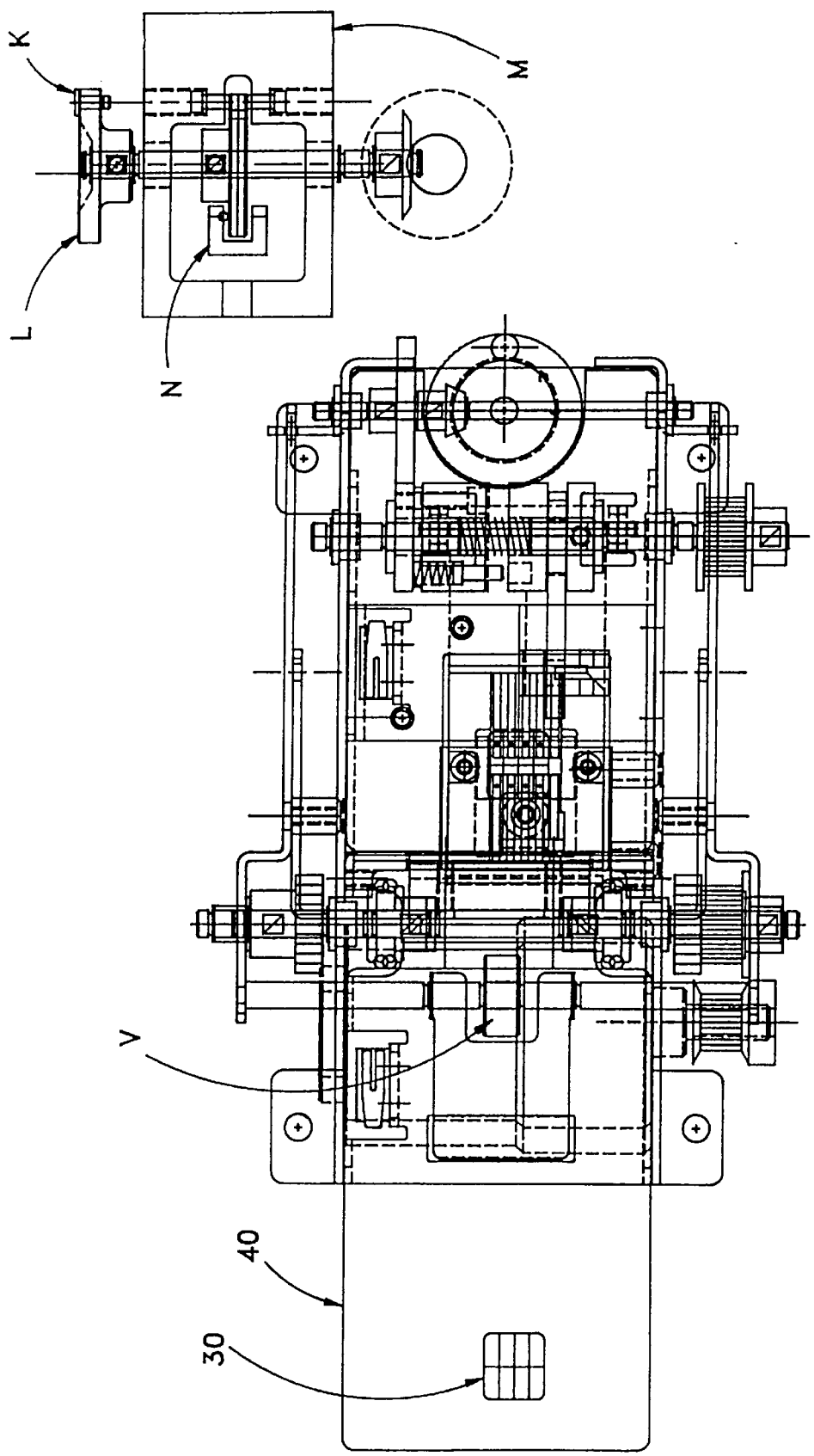
FIG. 5 shows the card encoding and transport mechanism in more detail including the read/write head, cantilever platform and the counter-rotating rollers that in combination with the cam wheel assist the card movement from the card stacker to the user.
Figure 6:
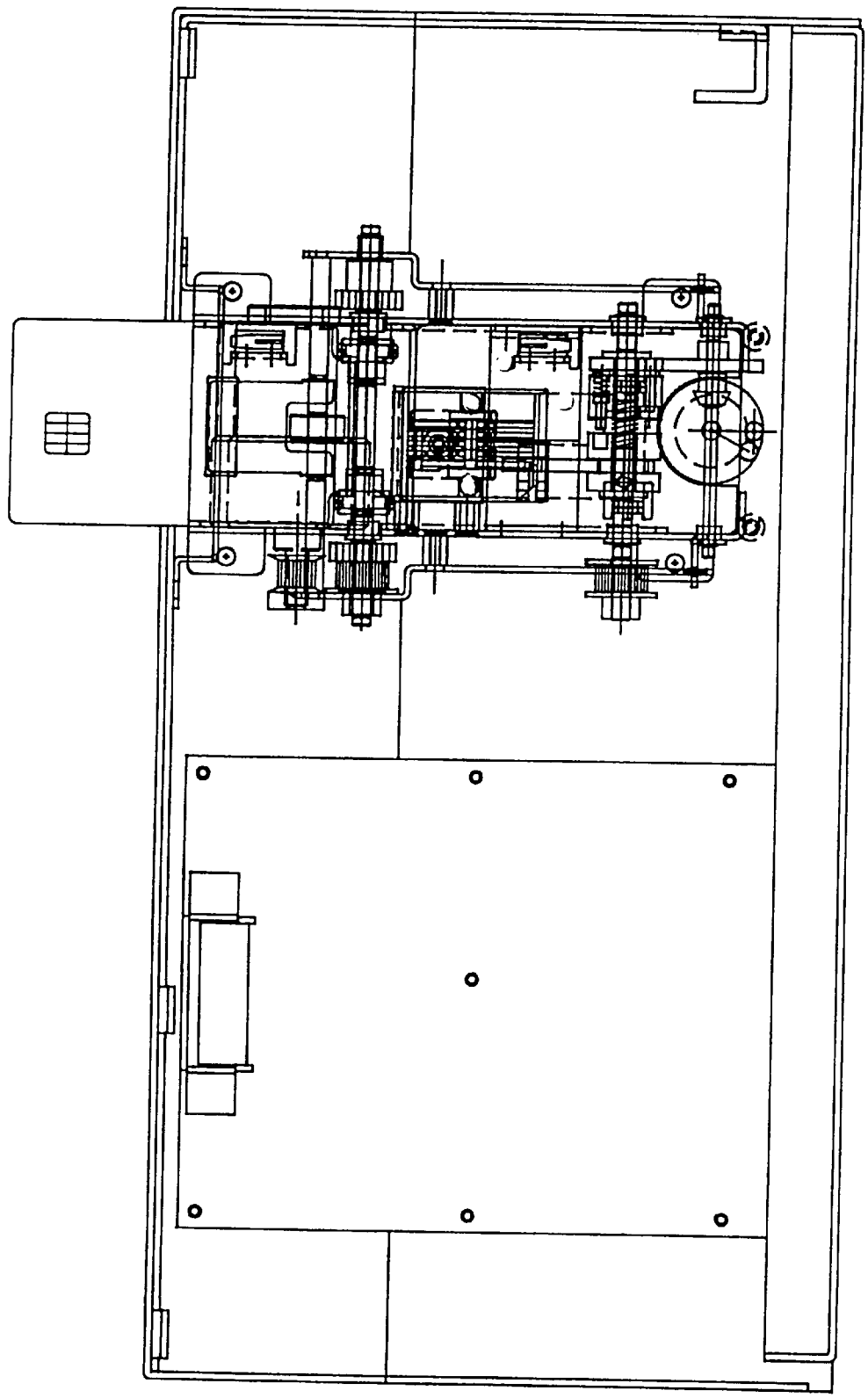
FIG. 6 is a detailed bottom view of the card dispenser showing the "8 contact" read/write head illustrating the card holder or stack and card transport mechanism, and includes an inset showing the card ejection clutch, pulleys and photoeye.

Referring to FIGS. 1 and 2 it is noted that the case or housing is rectangular in shape and is of a highly secure design to deter theft and vandalism. It is fabricated using two layers of 14 gauge stainless steel welded together to provide an effective strength of 7 gauge. One case is effectively "nested" inside the other. The top of the case 12 is sloped forward so that no one can tie a chain or rope around it and pull it off its wall mounting. The degree of slope of the top surface also prevents anyone from placing a drink on top of the case. All openings in the front of the case are of a size that prevent access by a human hand. The case has no opening covers in the front or on the side and is designed to mount flush against a wall to reduce risk of prying off covers. The complete front housing is one piece, and is hinged to a reinforced backplate which also has reinforced mounting studs. The front of the case has three small openings. Opening 14 accommodates the entry of currency. Opening 16 accepts a smart card or credit card. Opening 18 allows for the exit of a coded smart card from the dispenser. There is also a 40 character display 20 for user instructions and a telephone type keypad 22 to allow a user to interact with the system.

The smart card encoder/dispenser is shown in FIGS. 2–6. It consists of a metal card holder or stack 24 having a card capacity of approximately 300 cards. Holder 24 is precision built to ensure the exact stacked alignment of smart cards 20 so that the bottom card is aligned, "chip side down", precisely over the eight contacts 28 of a standard smart card read head contact block B. The bottom of the card holder has a slot which is approximately 1.5 times the thickness of a standard 30 mm card. This slot is large enough to allow the card to pass through during dispensing. A spring loaded, non-metallic retainer is positioned such that the slot is covered during the loading of cards and during the read/write cycle. The contact block B is mounted on a cantilever platform P that is raised or lowered by a solenoid A, under the control of a microcontroller to enable reading and writing to a smart card. The base of the card holder has a square hole in it to allow the read head block B to protrude through the base and make precise contact with the eight contacts of the chip 30 (FIG. 5) on the bottom card 40. A physical stop limits the upward travel of platform P to provide the correct compression of the contact springs and to prohibit "lifting" of cards off the support structure. The stop also ensures that the cards do not move during the read/write cycle. To ensure firm contact and reliable reading and writing to the chip, a force of approximately 4 Newtons is required against the card. A one pound weight is placed on top of the card stack to counteract this force and ensure that the last remaining card in the stack 26 is properly read. An "out of cards" sensor switch S1 determines if there is a card present in the stack. A second switch S2 determines that a card is present in the output chute, ready for removal by the user.

Figure 7A:
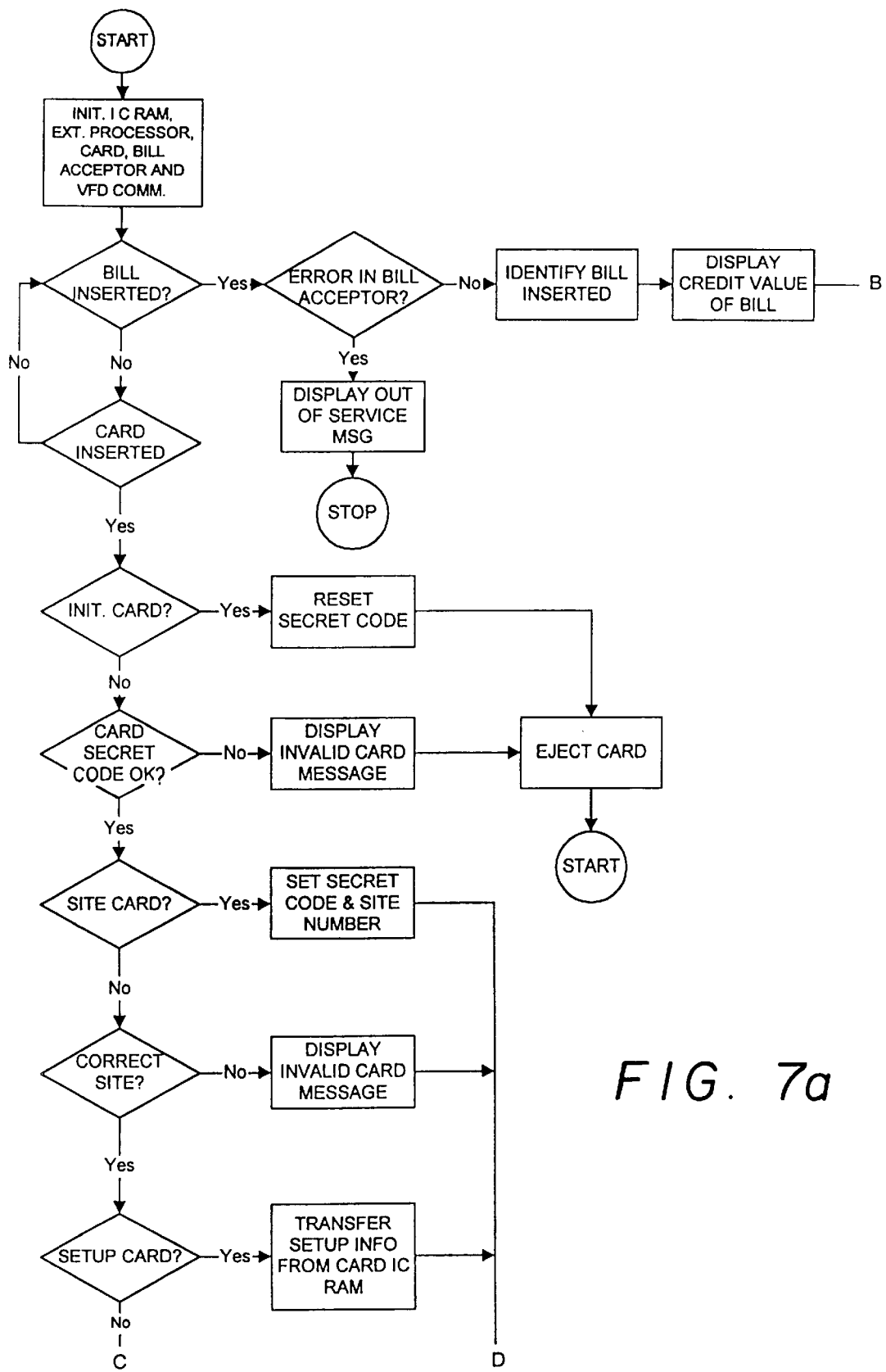
FIGS. 7a–d are a flow diagram describing a preferred process for identifying a bill and either dispensing a new card or adding value to an existing card by writing the value to the card before it is dispensed.
Figure 7B:
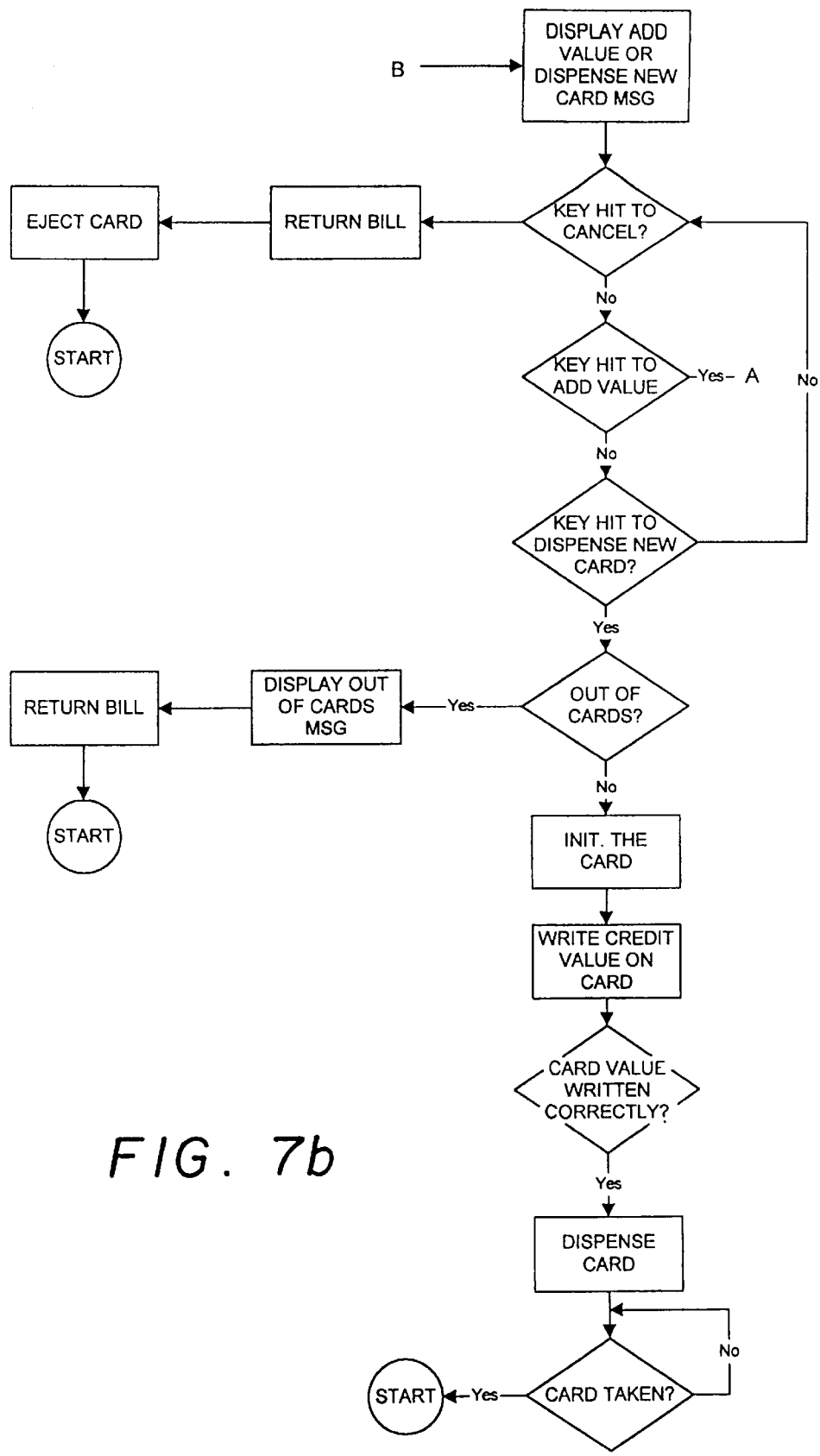
Figure 7C:
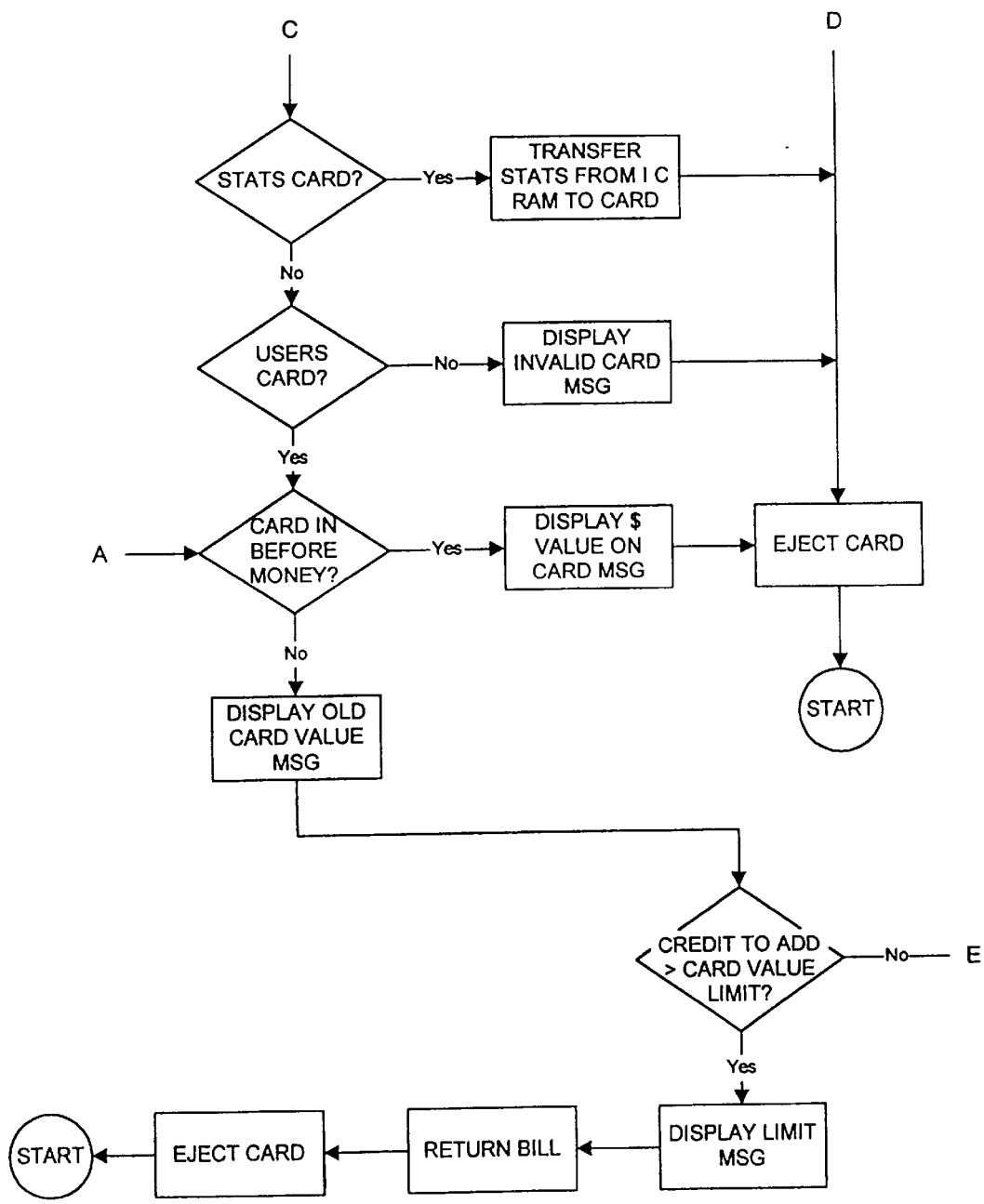
Figure 7D:
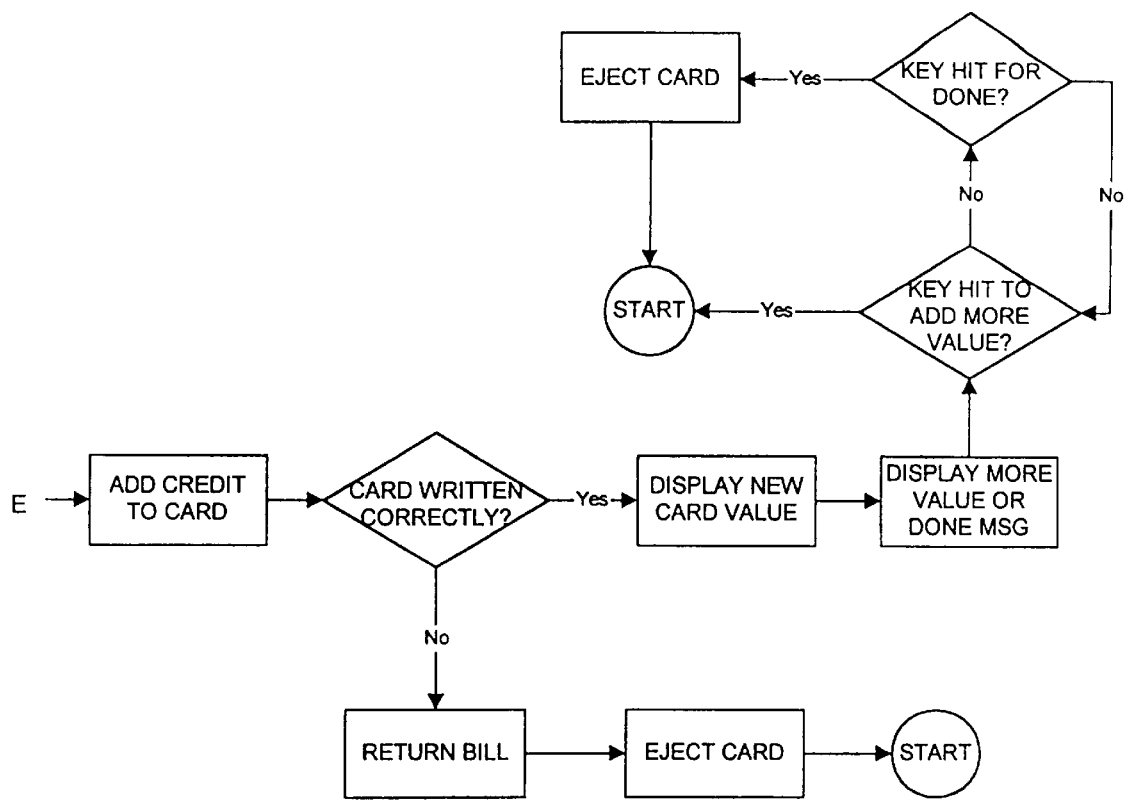
Figure 8A:
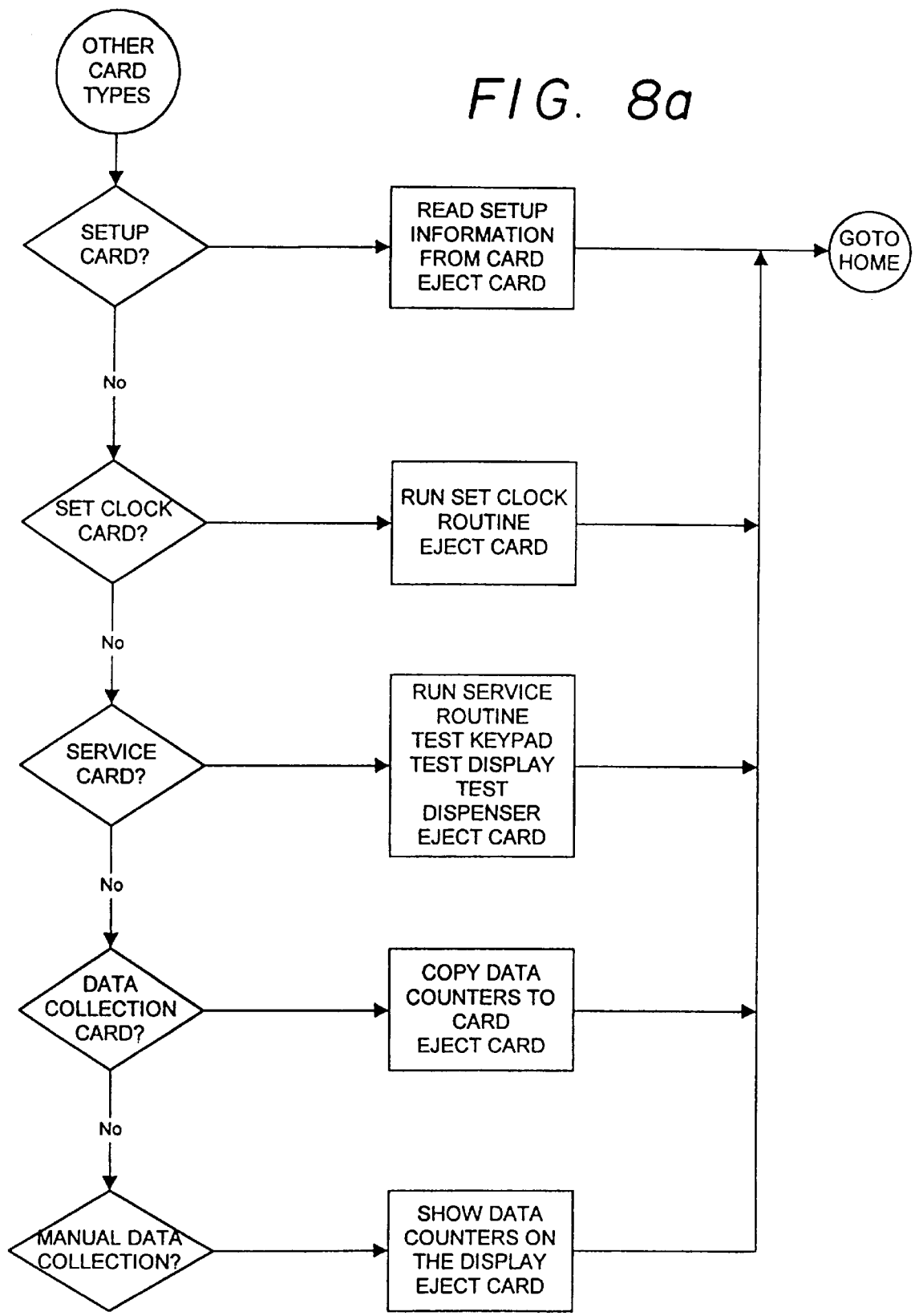
FIGS. 8a–e are an alternative preferred flow diagram for operating the microprocessor of the apparatus.
Figure 8B:
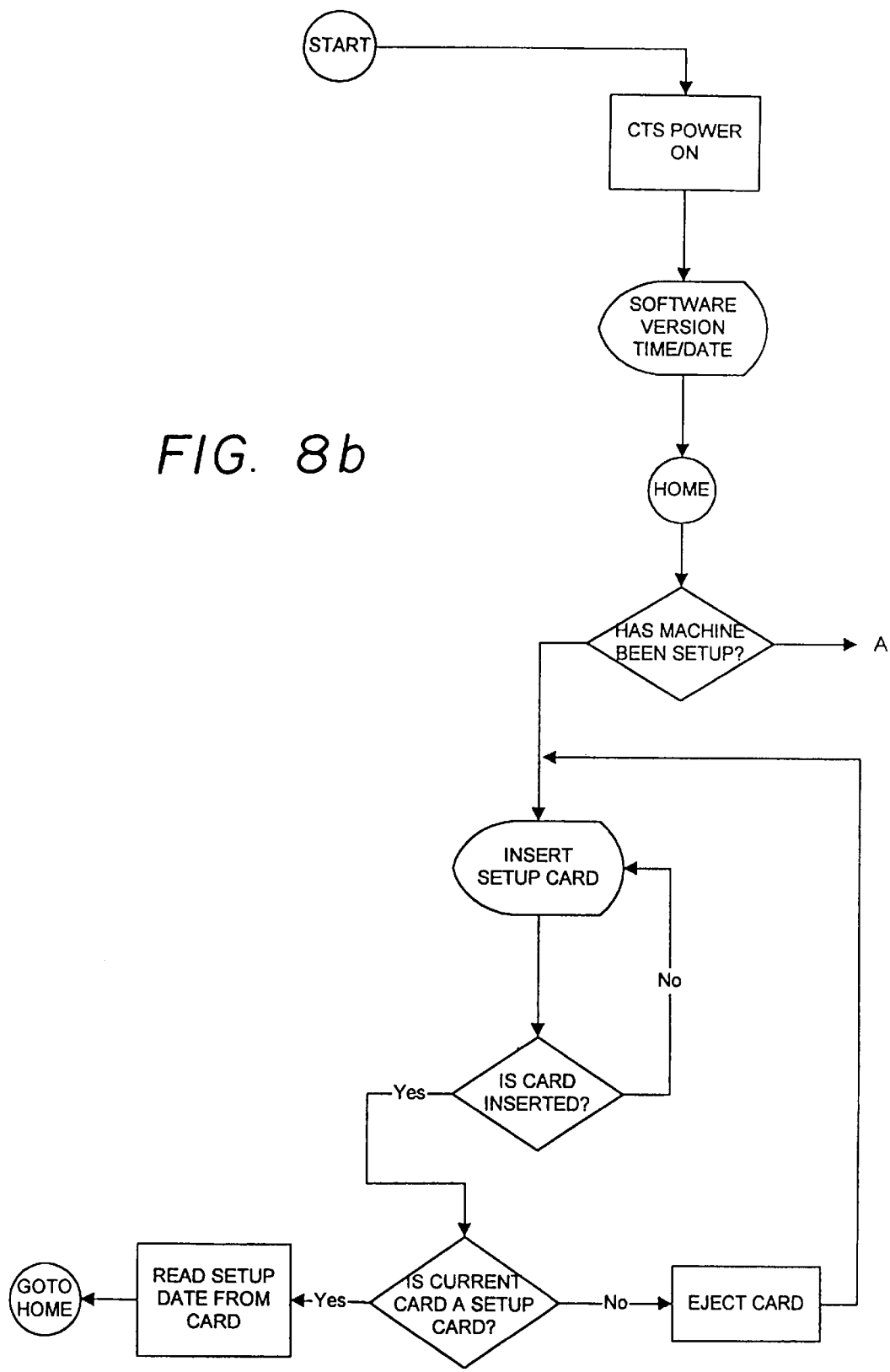
Figure 8C:
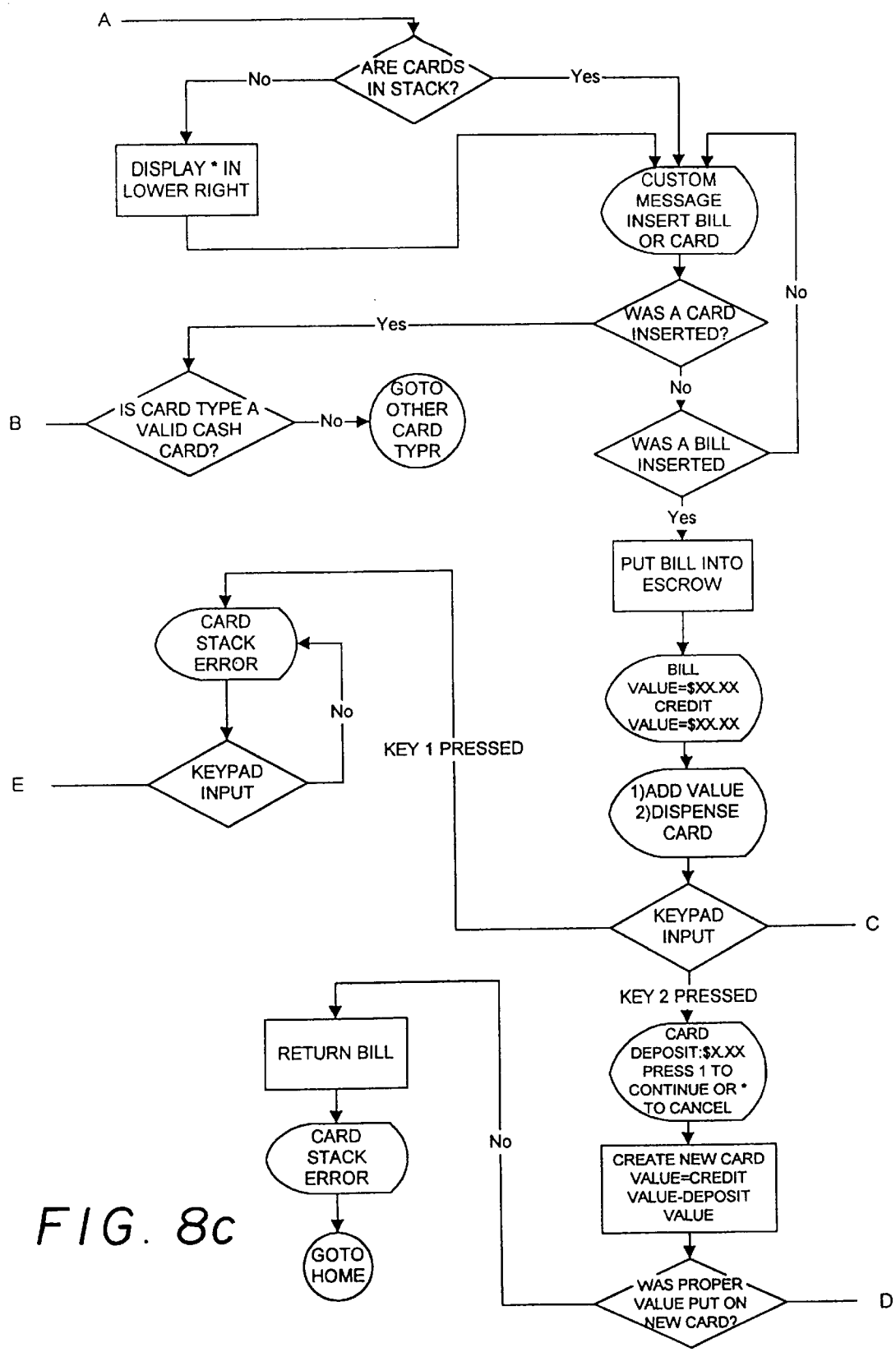
Figure 8D:
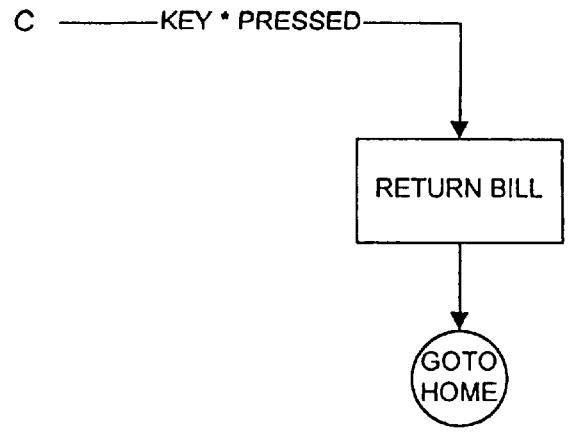
Figure 8D:
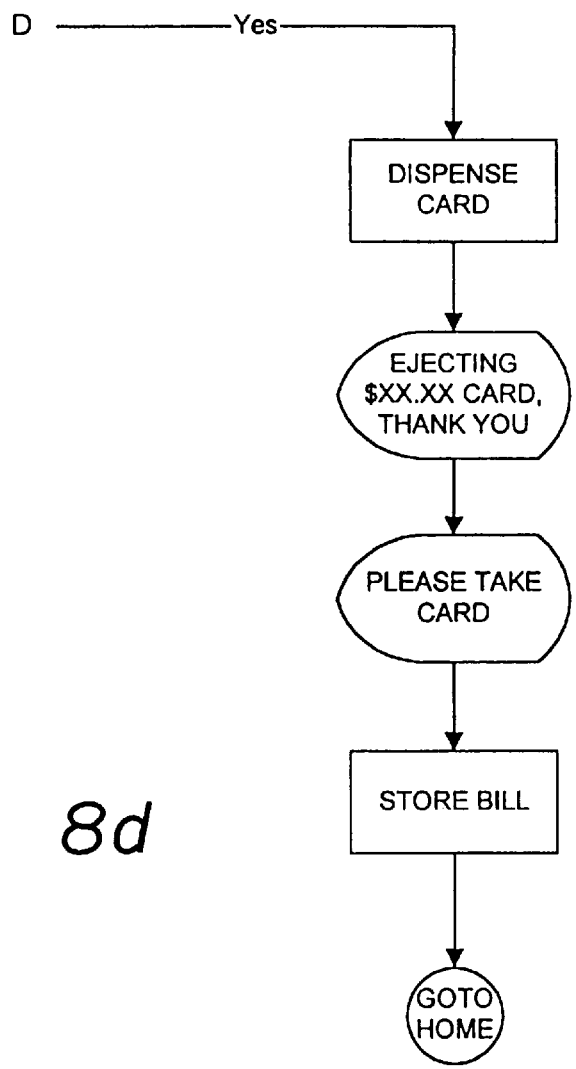
Figure 8E:
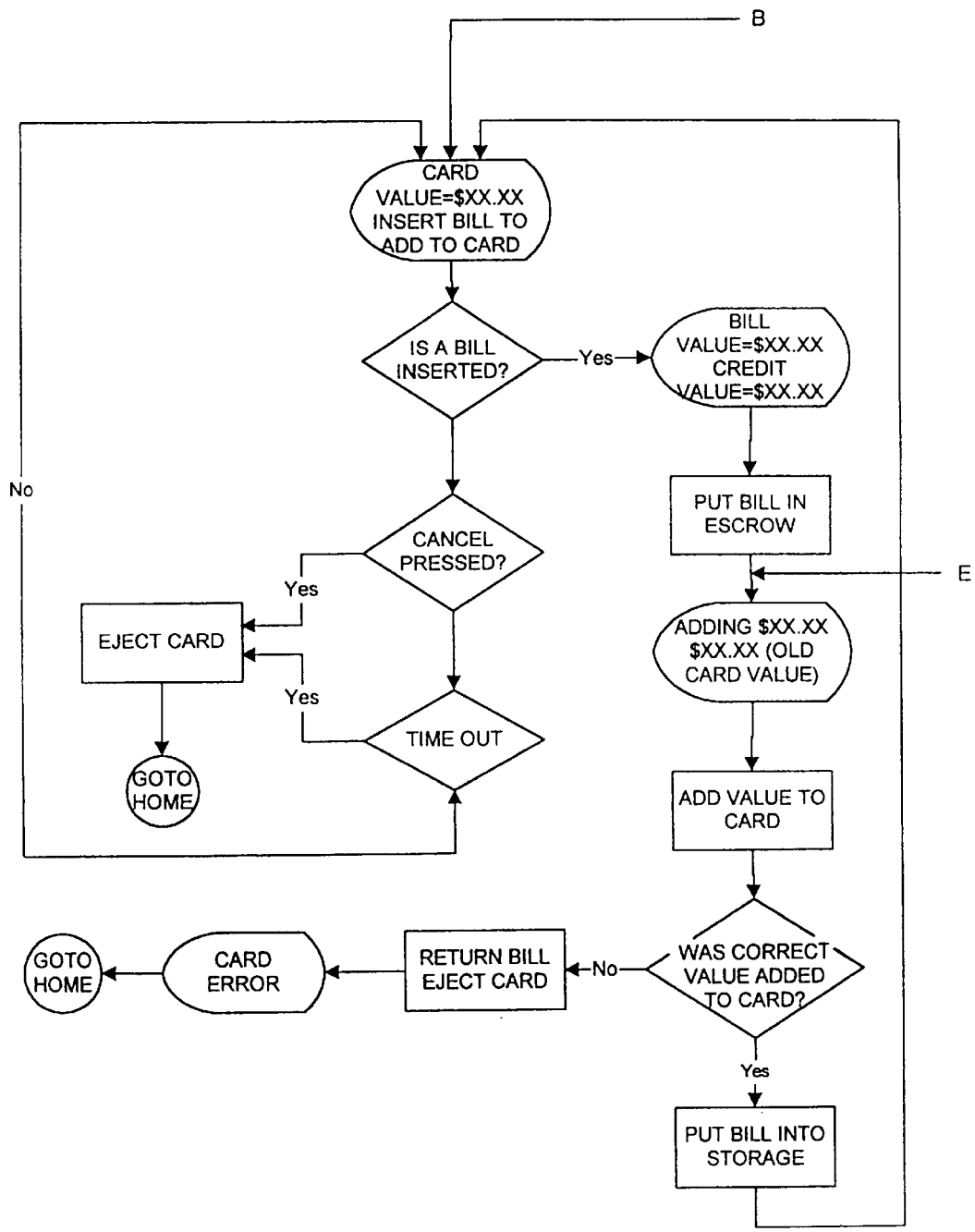

Various illustrative embodiments of the function and operation of the encoder/dispenser is to control by a sequence of instructions issued by a microprocessor described are shown in detail by the flow diagrams shown in FIGS. 7a–d, and 9a and b. The embodiment shown in FIGS. 7a–d is particularly adapted to permit a user to insert currency, either a bill or coin. If a bill or coin has been inserted the process is as described in the flow diagram at the "start" point. If a smart card is inserted, the process flow starts at point A in the flow diagram. At any time the user may cancel the transaction by pressing the * key on the keypad. FIG. 7B illustrates another preferred flow diagram for operating the apparatus.

Figure 9A:
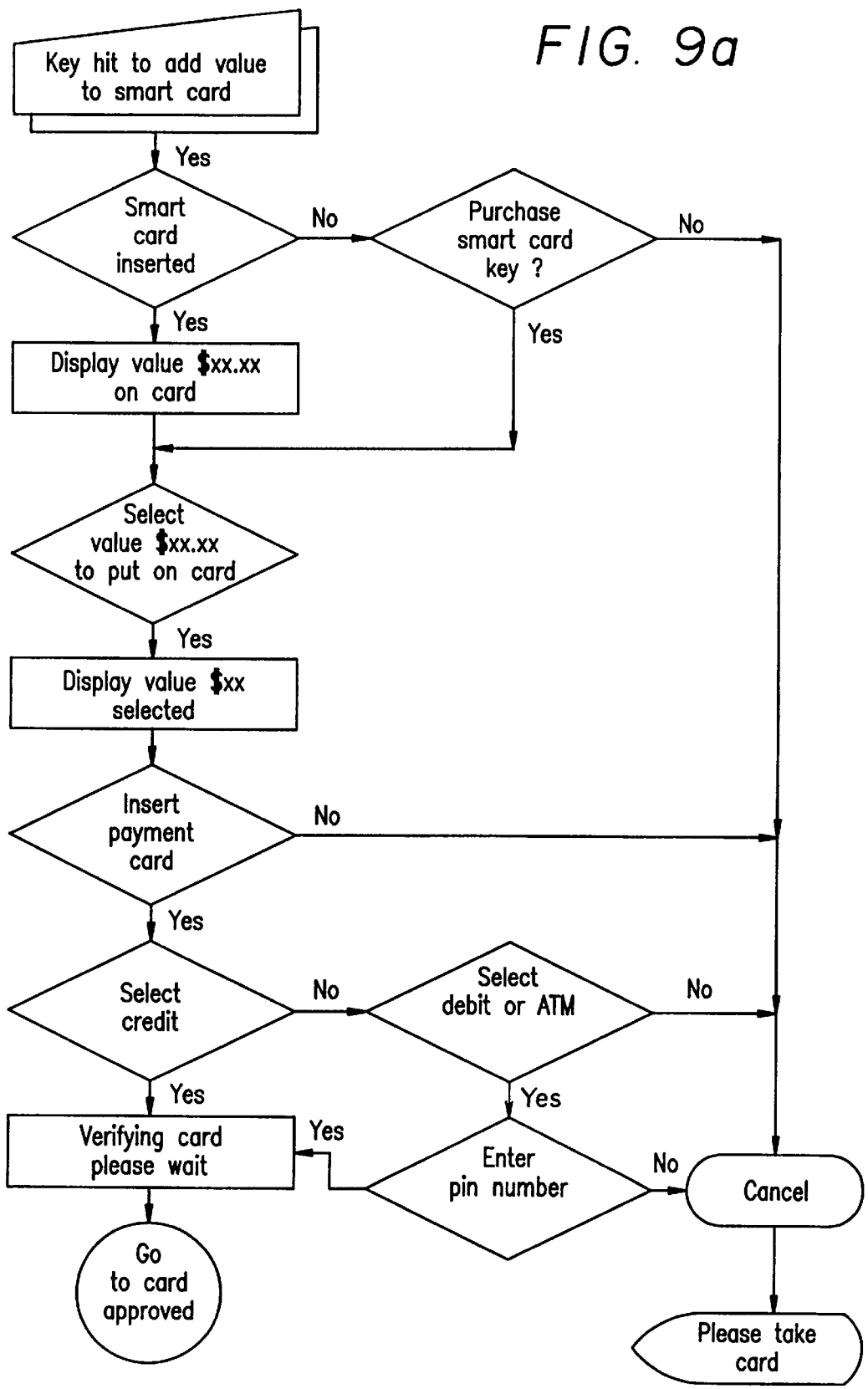
FIGS. 9a, b and c are respectively a flow diagram (FIGS. 9a and 9b) describing an alternative process carried out by the microprocessor for identifying a credit or debit card and either dispensing a new card or adding value to an existing card by writing the value to the card before it is dispensed, and a functional block diagram which provides an illustrative embodiment of how that microprocessor is connected to the encoder/dispenser, a credit/debit card reader and an interface for transmitting and receiving respectively authorization requests and replies thereto over a transmission medium to a central data bank, where credit records are maintained.
Figure 9B:
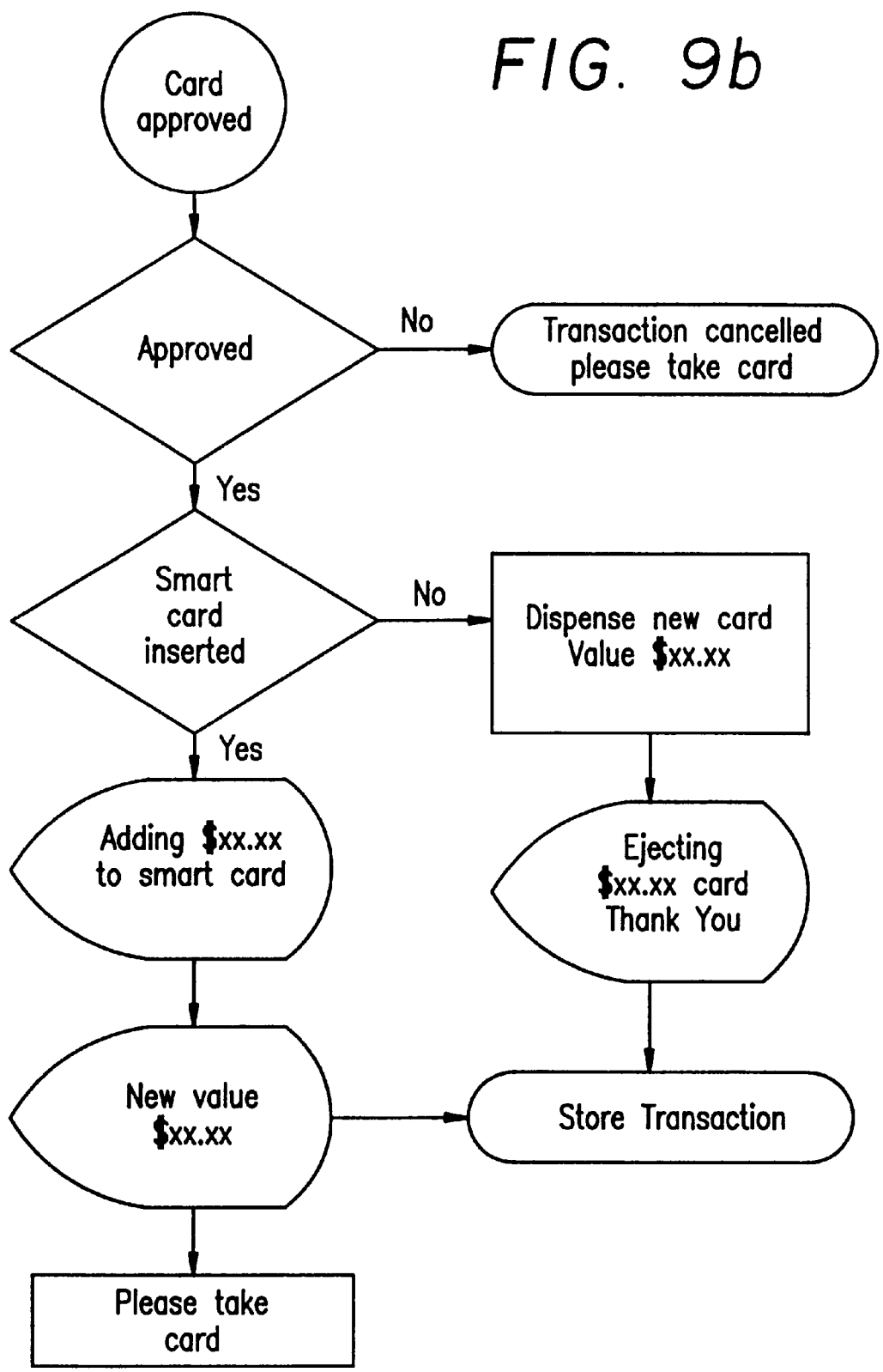
Figure 9C:
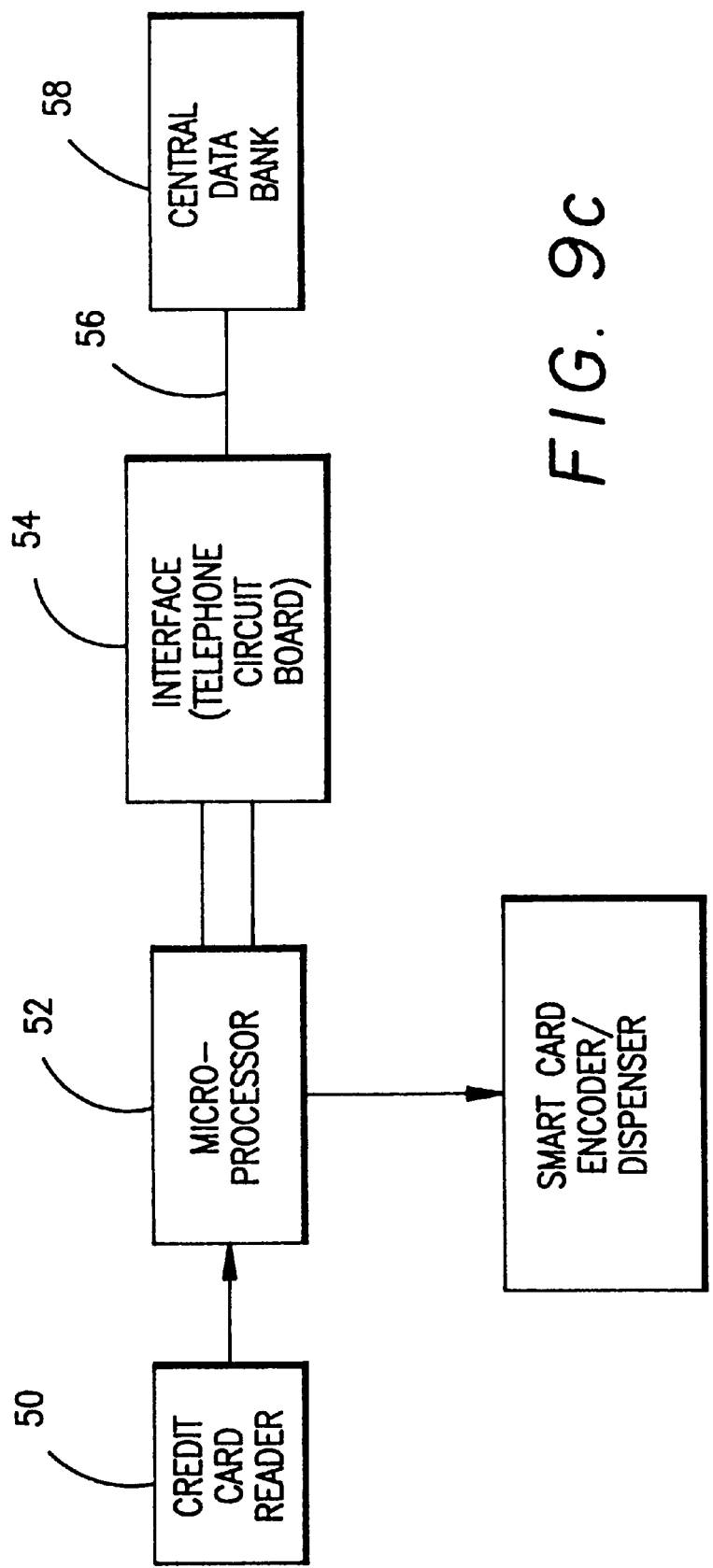

FIGS. 9a and b show an illustrative embodiment, wherein a credit or debit cards is read by a credit/debit card reader 50, as shown in FIG. 9c, to in turn provide a identification number (pin) to the microprocessor 52. This illustrative process verifies the inserted card by transmitting a request message carrying that pin via a well known interface over a suitable data transmission medium 56 to a central data bank 58. In turn the bank 58 checks the balance of the account associated with the transmitted pin and, if there is positive balance to cover the request, the authorization message is returned over the medium 56 to the microprocessor 52, which in turn actuates the encoder/dispenser to go to the card approval step as shown in FIG. 9b. If a sufficient balance is not available, a negative message is sent by the bank 58 and the process cancels the transaction. It is appreciated that the medium 56 may take the form of telephone wires, the internet or any of the other well known media.

In either case, a leading or lowermost card 40 is released from the card holder stack as follows. Once the microprocessor has completed the transaction by reading and/or writing to the smart card, the card is ejected by the following steps. The microprocessor first releases solenoid A, which drops the platform P away from the card stack. The microprocessor then commands a drive motor 42 to rotate in a counter-clockwise direction (See FIG. 4) which causes counter-rotation in both pulleys 2 and 3. Pulley 2 is integrally connected to a small toothed gear through the use of a spring loaded pin clutch C. The clutch is engaged by a solenoid D, through a non-metallic yoke E, guided and moving axially along a shaft F. As the clutch is engaged, a smaller gear G drives a larger gear H in the opposite direction. This transfers rotary motion to a small diameter bevel gear I. When meshed with the larger diameter bevel gear J, gear I transmits rotary motion 90 degrees. This allows the attachment of a smaller diameter "roller cam" K on the outer periphery of a driven support wheel L. A bearing housing M contains the bearings to support a "roller cam" wheel shaft, which also has two spring loaded pins. These provide the friction necessary to a brake disk when signaled by the photoeye N (See FIG. 5) that the "roller cam" has made one complete revolution. This signal also disengages the clutch which stops rotation on the "roller cam" while allowing for continued rotation of the motor and driven pulleys. As the support wheel L rotates, the roller cam revolves through its arc of travel to make contact with the rear edge of the bottom-most card. This pushes the card forward where it is received by the two counter-rotating friction drive wheels O. The drive wheels are operated by a pair of non-metallic spur gears Q, driven by pulley 3 and located opposite one another on the same shaft R. Located above these gears and friction rollers is a second set of gears and rollers S turning in the opposite clockwise direction. This assures positive card ejection since the upper set is spring loaded against the lower set with an interference fit when there is no card present. As the card is presented to the counter-rotating rollers, there is a "pivot up" action to provide for card clearance while also providing the necessary compression of the friction drive rollers onto the moving card to move the card to the eject position. The dual set of rollers effectively squeezes the card on top and bottom while it is driven through the rollers. A second shaft U on the upper pivoting drive assembly has an idler wheel V which maintains the position of the card until it is removed by the user. Also mounted on this shaft is a gate flapper W which prevents the intrusion of any foreign objects such as a flat, sharp knife that may otherwise be used to vandalize the dispenser after the card has been removed.

The card ejected switch S2 will sense the presence of a card 40 and signal the user via display 20 to "take card". Once the user has removed the card, switch S2 opens and the microprocessor then resets the process to start another transaction.

In addition to the function of smart card dispensing the following is a description of a unique process by which a set of smart cards are used for "off-line" installation, setup, diagnostics and data collection of the Smart Card Transaction System or vending machine. Since the smart card is basically a "PC on a card" setup and diagnostic information is programmed onto a smart card and the card then used as an "off-line" programming device to perform installation, setup and diagnostic functions. One of the main advantages of such a scheme over an on-line system is to prevent "hacking".

This off-line "setup smart card" is programmed on a PC using a smart card/PC interface and proprietary software. All programming instructions that control the operation of the Smart Card Transaction System are loaded onto the setup smart card. After the Smart Card Transaction System has been mounted or placed in its location and powered up, the setup card and a password are used to initialize and/or setup the machine for use. It is a simple two step process as follows: The first time the Card Transaction System is powered up the display will say "enter password". Upon receiving a valid password the display will then say "insert setup card" followed by "setup complete" if successful. If setup was unsuccessful a message will be displayed to "run diagnostics. The "setup smart card" contains diagnostic routines that guide a service engineer through a series of diagnostic routines to determine the fault status of the system which the engineer is trained to correct.

The same setup card is also used to re-set a Card Transaction System that has been tampered with to the extent that the micro-processor memory went into "self destruct" or secure mode. By inserting the setup card and valid password a service engineer may restore the unit to service.

Another smart card, created in a similar manner to the setup card just described is used for data collection. That is, the off-line collection of usage statistics, including but not limited to: the number and value of cards dispensed and the number and value of bills received.

In summary, the smart card transaction system is not only a unique dispenser of smart cards it also uses smart cards for the various management functions described above.

Although specific features of the invention are shown in some drawings and not others, this is for convenience only, as each feature may be combined with any or all of the other features in accordance with the invention. Other embodiments will occur to those skilled in the art and are within the following claims.

What is claimed:

1. Apparatus for writing data to and dispensing integrated circuit chip cards, said apparatus comprising:

an enclosure having a card dispensing slot;

a money acceptor that receives money and provides a signal representing the amount of the received money;

a chute mounted within said enclosure for holding a stack of a plurality of the integrated circuit chip cards such that an integrated circuit chip on each card faces toward a first end of the stack;

a write head mounted within said enclosure and located adjacent the first end of the stack of cards;

a control responsive to and connected to said money acceptor for receiving the signal indicating said amount of money received and for directing said write head to write the signal indicating the amount of money received on the integrated circuit chip of a leading card positioned at the first end of the stack; and a card dispenser for dispensing the leading card through said card dispensing slot and sequentially positioning a following card in the stack so that its integrated circuit chip is disposed adjacent to said write head.

2. The apparatus of claim 1 in which said enclosure includes walls that comprise double plated stainless steel.

3. The apparatus of claim 1 in which said enclosure includes a sloped top surface.

4. The apparatus of claim 3 in which there is included a data input device for inputting to said control a selected monetary value.

5. The apparatus of claim 4 in which said control comprises a microprocessor programmed to receive said selected monetary value and to verify that said selected monetary value corresponds to said received amount of monetary payment by said money acceptor.

6. The apparatus of claim 5 in which said write head is disposable between a first head position in which said write head engages the leading card of the stack and a second head position in which said write head does not engage the leading card of the stack.

7. The apparatus of claim 6 in which there is further included an actuator that is coupled to said write head for driving said write head between said first and second head positions.

8. The apparatus of claim 7 in which said microprocessor is programmed to respond to the verification that the selected monetary value corresponds to said amount of monetary payment received by said money acceptor to energize said actuator to move said write head from said second head position to said first head position.

9. The apparatus of claim 8 in which there is further included a cantilevered platform mounted in said enclosure for moving said write head between said first and second head positions.

10. The apparatus of claim 9 in which said actuator comprises a solenoid.

11. Apparatus for writing data to and dispensing a plurality of integrated circuit chip cards, each of the integrated circuit chip cards having at least one data exchange element disposed on a first surface of the card, said apparatus comprising:

an enclosure having a card dispensing slot;

a chute having first and second ends mounted within said enclosure and for receiving through said first end a plurality of integrated circuit chip cards and for arranging the plurality of the cards into a stack thereof so that the first surface of each of the integrated circuit chip cards is oriented toward said first end of said chute;

a write head mounted within said enclosure and including at least one data exchange element disposed toward the first surfaces of the plurality of cards arranged into the stack, the relative dimensions of each of the cards and of the chute, and the relative placement of the data exchange element of each of the cards and said data exchange element of said write head being determined so that the data exchange element of the card disposed at the first end of the stack is disposed in a data exchange relationship with said data exchange element of said write head, whereby said data exchange element of said write head may write data to the card disposed at the first end of the stack; and a card dispenser for dispensing a leading card from said first end of said chute through said card dispensing slot and sequentially positioning a following card in the stack so that its integrated circuit chip is disposed at said first end of said chute.

12. The apparatus of claim 11 in which said chute disposes the leading card in the stack in a first position, and said card dispenser transports the leading card from said first position and through said card dispensing slot.

13. The apparatus of claim 12 in which said card dispenser comprises a cam driven by a motor between a first cam position and a second cam position; when disposed in said first cam position, said cam does not engage a leading card disposed at said card position; when said motor is powered to drive said cam from said first cam position to said second cam position, said cam engages and transports the leading card from said first card position to a second card position.

14. The apparatus of claim 13 in which said card dispenser further comprises a card transporter for engaging the leading card when the leading card is disposed by said cam to a second card position and for transporting the leading card from said second card position through said card dispensing slot.

15. The apparatus of claim 14 in which said card dispenser comprises at least one motor driven roller.

16. The apparatus of claim 13 in which said card dispenser comprises a cam detector for determining when said cam is disposed in said first cam position.

17. The apparatus of claim 16 in which said card dispenser comprises an electric eye disposed to provide a signal when said cam is driven by said motor to said first cam position.

18. The apparatus of claim 17 in which said card dispenser further comprises a controller that is responsive to said signal of said electric eye to remove power from said motor and thereby, to dispose said cam at said first cam position.

19. The apparatus of claim 11 in which the data exchange element of the card and said data exchange element of said write head are respectively electrical contacts and are in said data exchange relationship when said elements are in physical contact with each other.

20. The method of operating a card dispenser to receive money and to repeatedly dispense from a stack of a plurality of integrated circuit chip cards a lead card of the stack, said method comprising the steps of:

a) determining the value of the received money;

b) initializing the lead card;

c) writing the value of the received money to the integrated circuit chip of the lead card; and d) after step c), dispensing the lead card.

21. The method of claim 20 in which each of the integrated circuit chip cards includes a first surface and an integrated circuit chip disposed in the first surface and there is included the step of arranging said plurality of the cards into a stack with first and second ends so that the first surface of each card of the stack is oriented to face toward the first end.

22. The method of claim 20 in which after the leading card is dispensed, sequentially positioning a following card of the stack as the next lead card.

23. The method of claim 22 in which after the value of received money is determined, the determined value of the received money is stored in a money escrow memory.

24. The method of claim 23 in which after the lead card is initialized, the value of the received money stored is accessed from the money escrow memory to be written in step c to the integrated circuit chip of the lead card.

25. The method of claim 20 in which the user inputs a selected monetary value.

26. The method of claim 25 in which it is verified that the selected monetary value corresponds to the amount of monetary payment received.

27. The method of claim 26 in which upon verification that the selected monetary value corresponds to said received amount of the monetary payment, the value of the amount of the received monetary payment is written to the lead card.

28. The method of claim 21 in which there is further included the step of orienting the stack of integrated circuit chip cards so that the lead is pressed under the weight of the stack of cards towards the first end of the stack.

* * * * *